(12) United States Patent
Qi et al.

(10) Patent No.: US 10,884,116 B2
(45) Date of Patent: Jan. 5, 2021

(54) HUMAN-BODY FOREIGN-MATTER DETECTION METHOD AND SYSTEM BASED ON MILLIMETRE-WAVE IMAGE

(71) Applicants: SHENZHEN CCT THZ TECHNOLOGY CO., LTD., Shenzhen (CN); CHINA COMMUNICATION TECHNOLOGY CO., LTD., Shenzhen (CN)

(72) Inventors: Chunchao Qi, Shenzhen (CN); Hanjiang Chen, Shenzhen (CN); Zhiquan Li, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

(*) Notice: Subject to any disclaimer, the term of this patent is extended or adjusted under 35 U.S.C. 154(b) by 292 days.

(21) Appl. No.: 16/033,246

(22) Filed: Jul. 12, 2018

(65) Prior Publication Data

US 2018/0329053 A1 Nov. 15, 2018

Related U.S. Application Data

(63) Continuation of application No. PCT/CN2016/096757, filed on Aug. 25, 2016.

(30) Foreign Application Priority Data

Aug. 25, 2016 (CN) .......................... 2016 1 0727745

(51) Int. Cl.
*G01S 13/88* (2006.01)
*G01S 7/41* (2006.01)
*G01S 13/89* (2006.01)

(52) U.S. Cl.
CPC .............. *G01S 13/887* (2013.01); *G01S 7/41* (2013.01); *G01S 7/412* (2013.01); *G01S 13/89* (2013.01)

(58) Field of Classification Search
None
See application file for complete search history.

(56) References Cited

U.S. PATENT DOCUMENTS

| | | | |
|---|---|---|---|
| 2006/0104489 A1 | 5/2006 | Bailey et al. | |
| 2013/0121529 A1* | 5/2013 | Fleisher | G06K 9/78 382/103 |
| 2014/0219560 A1 | 8/2014 | Robinson | |

FOREIGN PATENT DOCUMENTS

| | | |
|---|---|---|
| CN | 101887518 A | 11/2010 |
| CN | 102567733 A | 7/2012 |

(Continued)

OTHER PUBLICATIONS

Yu Wangyang et al: "Segmentation of Concealed Objects in Passive Millimeter-Wave Images Based on the Gaussian Mixture Model" Journal of Infrared Millimeter and Terahertz Waves Springer New York LLC US vol. 36 No. 4 , Feb. 17, 2015 (Feb. 17, 2015) pp. 400-421XP035460394 ISSN: 1866-6892 DOI:10.1007/S10762-015-0146-8.

(Continued)

*Primary Examiner* — Whitney Moore

(57) ABSTRACT

A human-body foreign-matter detection method and system based on millimeter-wave image. The method comprises: obtaining a millimeter-wave grayscale image of a human body; extracting a human-body contour image in the millimeter-wave grayscale image; constructing a vertical space distribution histogram in a vertical direction and a horizontal space distribution histogram in a horizontal direction for the human-body contour image; obtaining positions of limbs of the human body according to the vertical space distribution (Continued)

histogram, the horizontal space distribution histogram and a pre-set human-body proportion model; identifying a foreign matter in the human-body contour image according to pre-set foreign-matter feature identification models; and marking a position of the foreign matter on the human-body contour image according to the positions of the limbs, and generating a foreign-matter detection result.

10 Claims, 8 Drawing Sheets

(56) References Cited

FOREIGN PATENT DOCUMENTS

| CN | 102829315 A | 8/2012 |
|----|-------------|--------|
| CN | 102697503 A | 10/2012 |
| CN | 105513035 A | 4/2016 |
| CN | 105678792 A | 6/2016 |
| CN | 106372583 A | 2/2017 |

OTHER PUBLICATIONS

Haritaoglu 1 et al: "W4: Real-Time Surveillance of People and Their Activities" IEEE Transactions of Pattern Analysis and Machine Intelligence IEEE Computer Society USA vol. 22 No. 8, Aug. 1, 2000 (Aug. 1, 2000) pp. 809-830 XP000976488 ISSN: 0162-8828 DOI: 10.1109/34.868683.

* cited by examiner

HUMAN-BODY FOREIGN-MATTER DETECTION METHOD AND SYSTEM BASED ON MILLIMETRE-WAVE IMAGE

CROSS-REFERENCE TO RELATED APPLICATIONS

The present application is a continuation-application of International (PCT) Patent Application No. PCT/CN2016/096757 filed Aug. 25, 2016, which claims foreign priority of Chinese Patent Application No. 201610727745.7, filed on Aug. 25, 2016 in the State Intellectual Property Office of China, the entire contents of which are hereby incorporated by reference.

TECHNICAL FIELD

The present disclosure relates to a technical field of security inspection, and particularly to a human-body foreign-matter detection method and system based on millimeter-wave image.

BACKGROUND

With the increasing striking force against violent terrorists and for the consideration of safety of people's daily travelling, security inspection has become a necessary inspection item in people's public transportation.

However, current security inspection techniques mostly use infrared rays or metal detectors to inspect the human body, as infrared rays cannot accurately detect variations in the edges and contours of objects, and thus cannot accurately identify foreign matters, while metal detectors can only detect metallic objects, and nonmetallic foreign matters cannot be identified.

SUMMARY

Embodiments of the present disclosure provide a human-body foreign-matter detection method and system based on millimeter-wave image, aiming at solving the problem that current security inspection techniques mostly use infrared rays or metal detectors to inspect the human body, but infrared rays may not accurately detect variations in the edges and contours of objects, and thus cannot accurately identify foreign matters, while metal detectors can only detect metallic objects, and nonmetallic foreign matters cannot be identified.

On one aspect, the present disclosure provides a human-body foreign-matter detection method based on millimeter-wave image, including following steps.

The method may include obtaining a millimeter-wave grayscale image of a human body.

The method may include extracting a human-body contour image from the millimeter-wave grayscale image.

The method may include constructing a vertical space distribution histogram in a vertical direction and a horizontal space distribution histogram in a horizontal direction for the human-body contour image.

The method may include obtaining positions of limbs of the human body according to the vertical space distribution histogram, the horizontal space distribution histogram and a pre-set human-body proportion model.

The method may include identifying a foreign matter in the human-body contour image according to pre-set foreign-matter feature identification models.

The method may include marking a position of the foreign matter on the human-body contour image according to the positions of limbs, and generating a foreign-matter detection result.

On another aspect of the present disclosure, a human-body foreign-matter detection system based on millimeter-wave image is also provided, the system including following modules.

The system may include a human-body grayscale image obtaining module, configured to obtain a human-body millimeter-wave grayscale image.

The system may include a human-body contour image extraction module, configured to extract a human-body contour image from the millimeter-wave grayscale image.

The system may include a histogram construction module, configured to construct a vertical space distribution histogram in a vertical direction and a horizontal space distribution histogram in a horizontal direction for the human-body contour image.

The system may include a limb position obtaining module, configured to obtain positions of limbs of the human body according to the vertical space distribution histogram, the horizontal space distribution histogram and a pre-set human-body proportion model.

The system may include a foreign-matter identification module, configured to identify foreign matters in the human-body contour image according to pre-set foreign-matter feature identification models.

The system may include a foreign-matter marking module, configured to mark a position of the foreign matter on the human-body contour image according to the positions of limbs, and to generate a foreign-matter detection result.

In the embodiment of the present disclosure, by obtaining a human-body millimeter-wave grayscale image, a human-body contour image from the millimeter-wave grayscale image is extracted, and the positions of limbs of the human body is obtained according to a vertical space distribution histogram in the vertical direction and a horizontal space distribution in the horizontal direction for the human-body contour image. Based on the pie-set foreign-matter feature identification models, the foreign matter in the human-body contour image is identified, and by marking the position of the foreign matter on the human-body contour image and generating a foreign-matter detection result, it may greatly improve the accuracy of the foreign-matter detection, and both metallic foreign matters and non-metallic foreign matters may be identified.

DETAILED DESCRIPTION OF THE EXEMPLARY EMBODIMENTS

In order that the skilled in the art may better understand the solution of the present disclosure, the technical solutions in the embodiments of the present disclosure will be clearly described below in conjunction with the accompanying drawings in the embodiments of the present disclosure. Apparently the described embodiments are merely a part of the present disclosure, instead of all. All other embodiments acquired by a person of ordinary skill in the art, based on the embodiments of the present disclosure without any creative efforts, shall fall into the protection scope of the present disclosure.

The term "comprising" and any variations of the term in the description and claims of the present disclosure as well as in the accompanying drawings are intended to cover non-exclusive inclusions. For example, a process, or method that comprises a series of blocks or units, or system, product, or device is not limited to the listed steps, modules, or units, but may optionally include unlisted steps, modules, or units, or optionally may also include other steps, modules, or units, which are inherent to these processes, methods, products, or devices.

The human skin has a larger dielectric constant for millimeter-wave signals (millimeter-wave refers to electromagnetic waves with a wavelength of 1 to 10 millimeters and a frequency of 26.5 GHz to 300 GHz) than a cloth-like fabric, which is reflected in a millimeter-wave grayscale image of a human body that is, the imaging grayscale of the human-body region is significantly higher than the imaging grayscale of a cloth-like fabric. In the millimeter-wave grayscale image of the human body, the texture information of the human-body region is poor and the speckle noise pollution is severe. However, the millimeter-wave grayscale image of the human body usually shows a symmetrical human contour pattern under a certain imaging angle. In the light of these characteristics of the millimeter-wave grayscale image of the human body, the millimeter-wave can be applied in the security inspection field to detect the foreign matter of the human body. The present disclosure specifically provides the following embodiments:

First Embodiment

Figure 1:
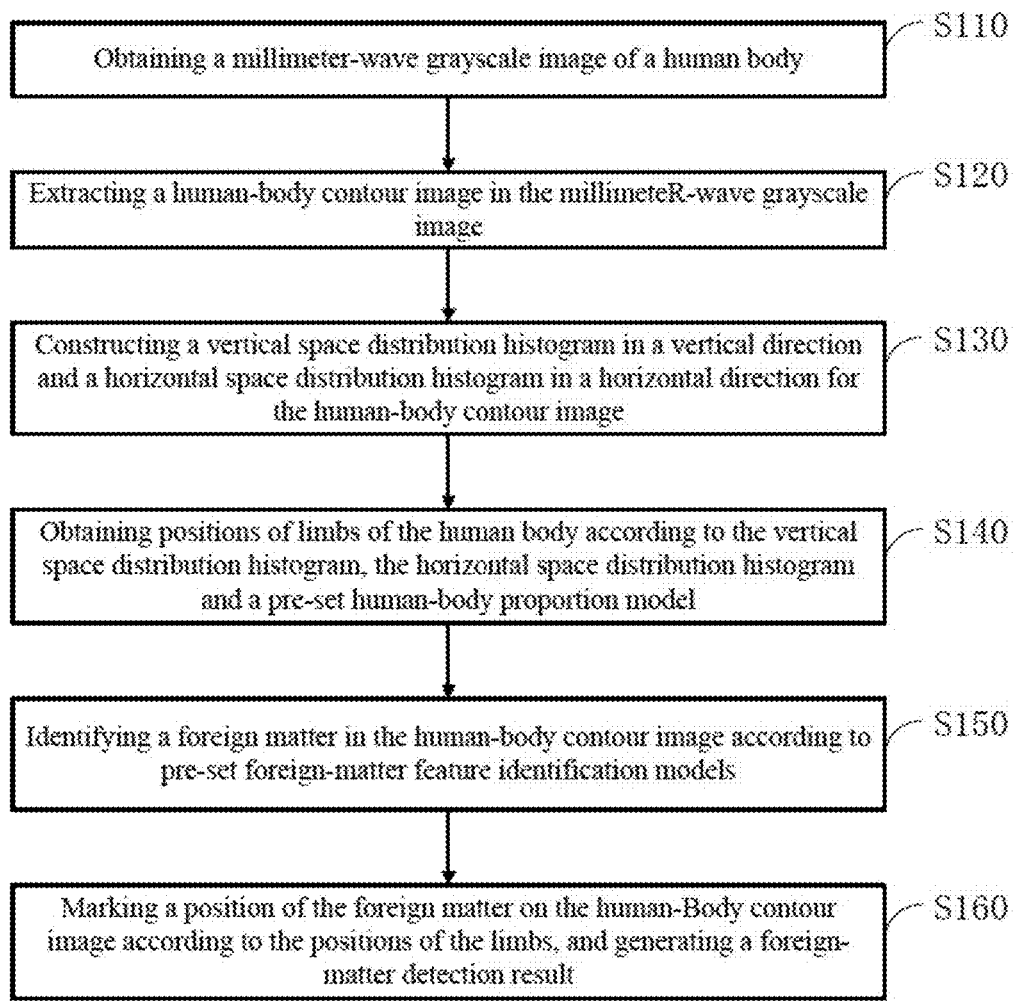
FIG. 1 is a basic flow chart of a human-body foreign-matter detection method based on millimeter-wave image provided in a first embodiment of the present disclosure.

As shown in FIG. 1, a human-body foreign-matter detection method based on a millimeter-wave image is provided in this embodiment including following steps.

In S110, the method may include obtaining a millimeter-wave grayscale image of a human body.

In a specific application, the human body may be asked to lift both hands over the head or to raise both hands to a height the same as the shoulders. It is also possible to let the human body stand with both hands prolapsing naturally, or with other standing postures that meet the security inspection standards. The embodiments of the present disclosure do not specifically limit the standing position of the human body. A millimeter-wave data collecting device (for example, a millimeter-wave transceiver) is then adopted to collect millimeter-wave data on the front or back of the human body, and a millimeter-wave imaging system (for example, a millimeter-wave imager) is used to process the millimeter-wave data of the human body into a millimeter-wave grayscale image of the front or back of the human body.

Figure 2:
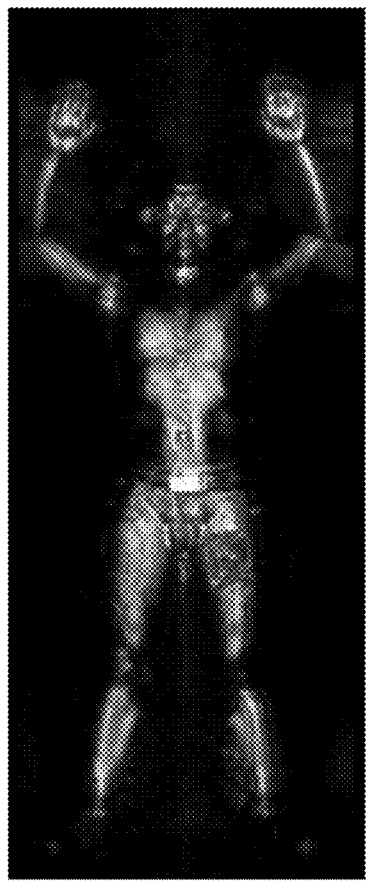
FIG. 2 is a millimeter-wave grayscale image provided by the first embodiment of the present disclosure.

FIG. 2 shows the millimeter-wave grayscale image of a human body of a grown man with both hands lifted high above his head.

In S120, the method may include extracting a human-body contour image from the millimeter-wave grayscale image.

In a specific application, the human-body contour image refers to an image corresponding to the limb contour shape of the human body.

In one embodiment, step S120 specifically includes following steps.

Figure 3:
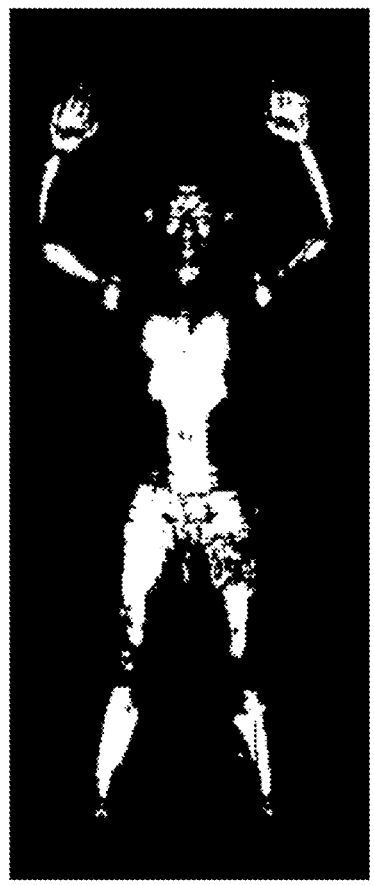
FIG. 3 is a binarized image provided by the first embodiment of the present disclosure.

In S121, the method may include performing grayscale segmentation on the millimeter-wave grayscale image $I(x,y)$, to obtain a binarized image $B(x,y)$ of the millimeter-wave grayscale image $I(x,y)$. The binarized image $B(x,y)$ is shown in FIG. 3.

In a specific application, the grayscale segmentation of millimeter-wave grayscale image $I(x,y)$ in step S121 to acquire the corresponding binarized image $B(x,y)$ can be achieved according to the following equation:

$$B(x, y) = \begin{cases} 255 & I(x, y) \geq T \\ 0 & I(x, y) < T \end{cases} \quad 1 \leq x \leq X, 1 \leq y \leq Y ;$$

Herein, x is the number of image columns, y is the number of image rows. T is a threshold, and when the value of $B(x,y)$ is 255, it represents the human-body region.

Figure 4:
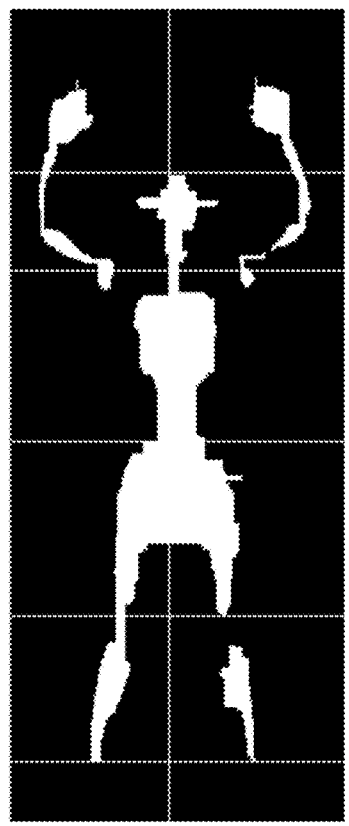
FIG. 4 is a human-body contour image provided by the first embodiment of the present disclosure.

In S122, the method may include performing morphological operation on the binarized image $B(x,y)$ both in the horizontal direction and in the vertical direction, to generate a human-body contour image $B_2(x,y)$. The human-body contour image $B_2(x,y)$ is shown in FIG. 4.

In S122, the horizontal direction refers to a direction perpendicular to the human height direction, and the vertical direction refers to a direction parallel to the human height direction.

In specific applications, step S122 may specifically include following steps.

Step S122 may include performing a morphological expansion and an erosion operation on the image $B(x,y)$ in the horizontal and vertical directions. The size of a kernel function of the expansion operation is 1×3, and a kernel function of the erosion operation is 3×1. The expressions of the expansion operation and the erosion operation are respectively shown as follows.

$$B_2(x, y) = \max_{(x',y').element(x',y') \neq 0} B(x + x', y + y') \text{ (expansion operation)}.$$

$$B_2(x, y) = \min_{(x',y').element(x',y') \neq 0} B(x + x', y + y') \text{ (erosion operation)}.$$

Herein, x' and y' represent the translation unit values corresponding to the kernel functions.

In a specific application, during the above-mentioned morphological operations, the erosion operation may be performed on the binarized image B(x,y) after the expansion operation, to acquire a human-body contour image $B_2(x,y)$; or the binarized image B(x,y) may also firstly be performed with the erosion operation and then the expansion operation, to acquire a human-body contour image $B_2(x,y)$. In order to attain an edge-smoothed human body contour image, in the morphological operation, the present disclosure optionally performs the erosion operation after the expansion operation on the binarized image B(x,y), to acquire an edge-smoothed human body contour image $B_2(x,y)$.

In S130, the method may include constructing a vertical space distribution histogram in a vertical direction and a horizontal space distribution histogram in a horizontal direction for the human-body contour image.

The space distribution histogram in the present embodiment refers to a histogram attained by performing statistical operations on the grayscale value information of the human-body contour image according to the spatial position. The vertical space distribution histogram specifically means a histogram wherein the spatial position of the human body from left to right (the direction from left to right, refers to the direction from the left side of the human body to the right side and parallel to the horizontal plane, when the human body stands on the horizontal plane) is regarded as an abscissa, and the frequency at which the grayscale value of the contour image appears within the length of the unit spatial position is regarded as an ordinate. Similarly, the horizontal space distribution histogram specifically refers to a histogram wherein the spatial position from top to bottom (the direction from top to bottom, refers to the direction from the top of the human body to the bottom of the foot and perpendicular to the horizontal plane when the human body stands on a horizontal plane) is regarded as an ordinate, and the frequency at which the grayscale value of the human-body contour image appears within the length of the unit spatial position is used as abscissa.

Figure 5:
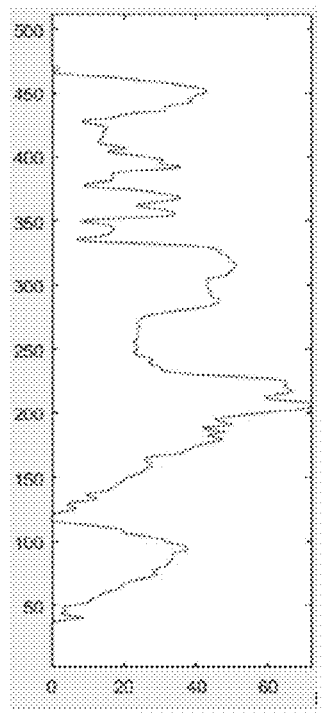
FIG. 5 is a vertical space distribution histogram provided by the first embodiment of the present disclosure.

In a specific application, the vertical space distribution histogram H is shown in FIG. 5. In step S130, a vertical space distribution histogram H of the human-body contour image $B_2(x,y)$ in the vertical direction is constructed, which can be specifically achieved by the following formula:

$$H(x) = \sum_y \delta(B_2(x, y) == 255).$$

The vertical space distribution histogram H is smoothed, and the formula to set the smoothness scale to 3 is as follows:

$$H(x) = \begin{cases} H(x) & x < 2 \\ (H(x-1) + H(x) + H(x+1))/3 & 2 \leq x \leq X - 1 \\ H(x) & x > X - 1 \end{cases}.$$

Figure 6:
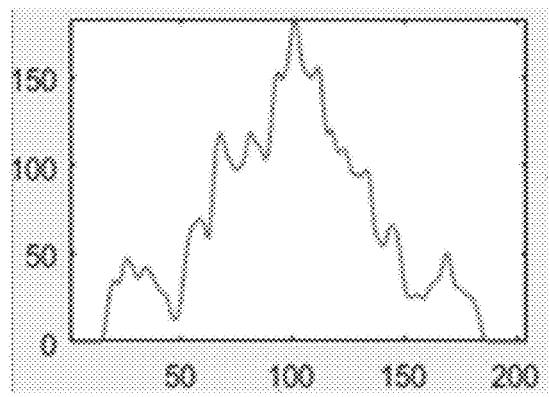
FIG. 6 is a horizontal space distribution histogram provided by the first embodiment of the present disclosure.

In a specific application, a horizontal space distribution histogram V is shown in FIG. 6. In step S130, the horizontal space distribution histogram V in the horizontal direction for the human-body contour image $B_2(x, y)$ is constructed, which can be specifically achieved by the following formula:

$$V(y) = \sum_x \delta(B_2(x, y) == 255)$$

The vertical space distribution histogram V is smoothed, and the formula to set the smoothing scale to 3 is as follows:

$$V(y) = \begin{cases} V(y) & y < 2 \\ (V(y-1) + V(y) + H(y+1))/3 & 2 \leq y \leq Y - 1 \\ H(y) & y > Y - 1 \end{cases}.$$

In S140, the method may include obtaining positions of limbs of the human body according to the vertical space distribution histogram, the horizontal space distribution histogram and a pre-set human-body proportion model.

In a specific application, the human-body proportion model is constructed based on the characteristic of the human-body limb structure, the proportion between the limbs, and the shape of the limb etc.

In a specific application, the positions of limbs include the positions of head, shoulders, chest, abdomen, crotch, extremities (both hands and feet), and knee joint of the human body. In a special case, for the limb-disabled person, a part of the data corresponding to the positions of limbs may be missing.

In S150, the method may include identifying foreign matters in the human-body contour image according to pre-set foreign-matter feature identification models.

In a specific application, the foreign matters may be metallic foreign matters like metallic firearms, cutting tools and gold nuggets etc., or may be non-metallic foreign matters like chemical agents, ivory and jade etc.

In one embodiment, step S150 includes following steps.

According to a region in which the grayscale values of the human-body contour image are larger than a pre-set grayscale threshold with a clear contour, the position of the metallic foreign matter is determined.

According to the geometrical region with a complex texture and a clear contour in the human-body contour image, the position of the non-metallic foreign matter is determined.

According to a region with a clear contour and close to the edge of the human-body contour image, in the millimeter-wave grayscale image, the position of the foreign matter at the edge of the human-contour image is determined.

In step S160, the method may include marking the position of the foreign matter on the human-body contour image according to the positions of limbs and generating a foreign-matter detection result. In a specific application, marking the position of the foreign matter on the human-body contour image specifically means marking a foreign matter at the position corresponding to each limb on the human-body contour image, for example, when the foreign matter is in the abdomen of the human body, the foreign matter would be marked on the position of the abdomen on the human-body contour image.

Figure 7:
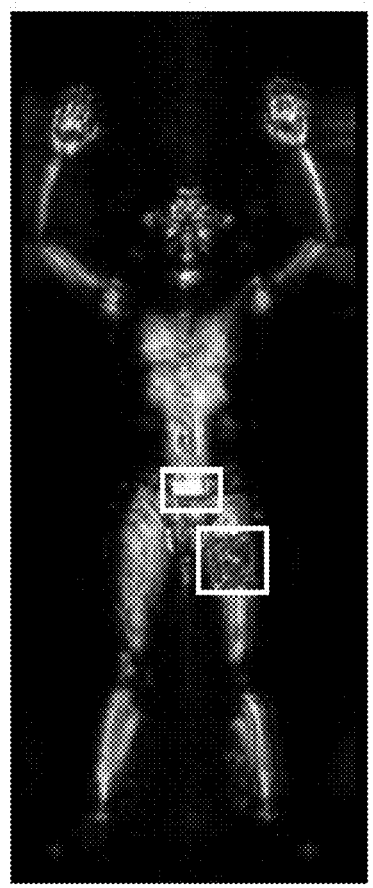
FIG. 7 is a diagram of a foreign-matter detection result provided by the first embodiment of the present disclosure.

As shown in FIG. 7, when the foreign matters are detected in the abdomen and right in front of the left thigh of the human body, the positions of the foreign matters are clearly marked with conspicuous rectangles directly at the abdomen position and the position right in front of the thigh, in the human-body contour image.

In a specific application, the foreign-matter detection result may be presented in the form of text, images, voice, forms, etc. For example, when there is a foreign matter on the chest of the human body, it may be expressed by text of "chest" or more specifically of "metallic foreign matter exists on the chest".

In the embodiment of the present disclosure, by obtaining the human-body millimeter-wave grayscale image, the human-body contour image from the millimeter-wave grayscale image is extracted, and the positions of limbs of the human body is obtained according to the vertical space distribution histogram in the vertical direction and the horizontal space distribution in the horizontal direction for the human-body contour image. Based on the pre-set foreign-matter feature identification models, the foreign matter in the human-body contour image is identified, and by marking the position of the foreign matter on the human-body contour image and generating a foreign-matter detection result, it may greatly improve the accuracy of the foreign-matter detection, and both metallic foreign matters and non-metallic foreign matters may be identified.

Second Embodiment

Figure 8:
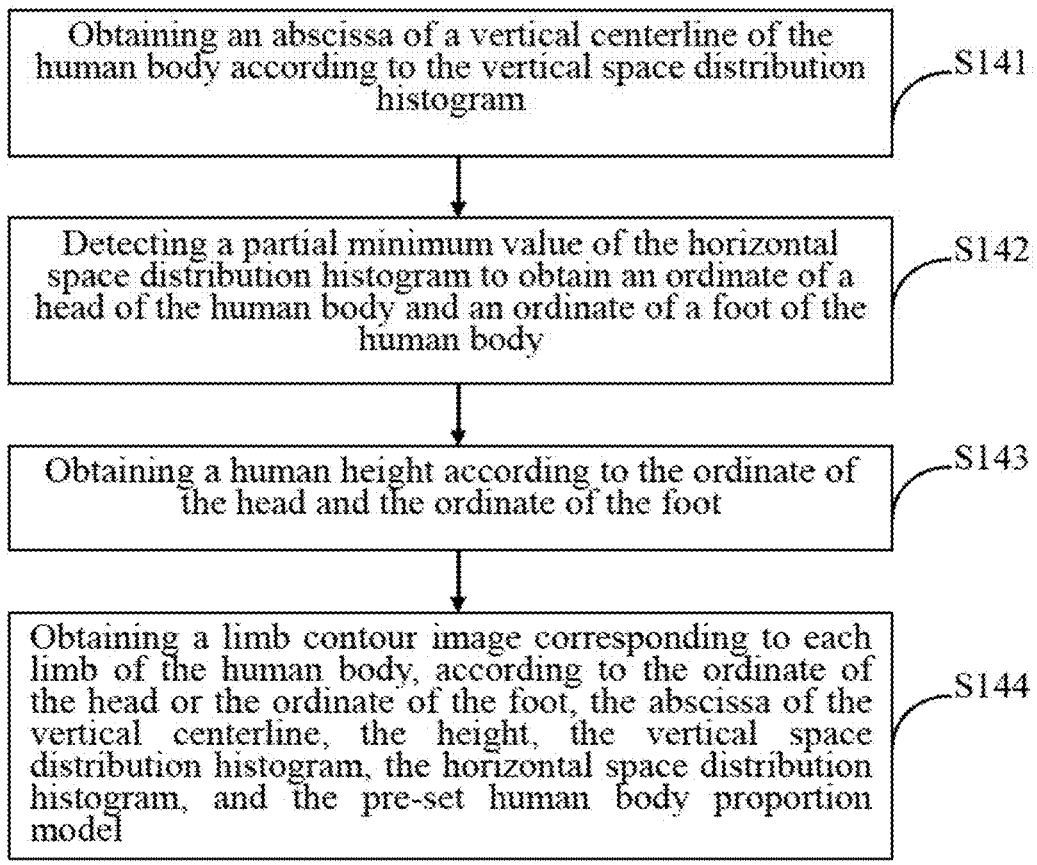
FIG. 8 is a basic flow chart of a human-body foreign-matter defection method based on millimeter-wave image provided in a second embodiment of the present disclosure.

As shown in FIG. 8, this embodiment is a further detailed description of step S140 in the first embodiment. In this embodiment, step S140 may include following steps.

In S141, the method may include obtaining an abscissa of a vertical centerline of the human body, according to the vertical space distribution histogram.

In one embodiment, step S141 specifically includes following steps.

In S1411, the method may include extracting an upper half of the vertical distribution histogram H as a sub-vertical distribution histogram $H_2$.

In a specific application, the sub-vertical distribution histogram $H_2$ is the upper half of the vertical distribution histogram H, that is, extracted in a manner of 50%*H. This embodiment may also extract the upper half of the vertical distribution histogram H according to other ratios. In this embodiment, the extraction ratio is not limited.

In S1412, the method may include obtaining a maximum value of the sub-vertical distribution histogram $H_2$. The maximum value is obtained by following formula:

$$x_{mid} = \max_i H_i, \min(x) \le i \le \max(x);$$

Herein, the column where $x_{mid}$ is located is the position of the abscissa of the vertical centerline. As shown in FIG. 4, the line perpendicular to multiple horizontal lines and passing through the head, chest, abdomen and crotch of the human body is the vertical centerline.

In a specific application, the abscissa of the vertical centerline may also be acquired in other methods, according to the vertical distribution histogram, which is not illustrated in this disclosure.

In S142, the method may include detecting a partial minimum value of the horizontal space distribution histogram to obtain the ordinate of the human head and the ordinate of the human foot.

In one embodiment, step S142 specifically includes following steps.

In S1421, the method may include detecting a partial minimum value of a first region of the horizontal space distribution histogram, and determining the ordinate of the human head according to the row where the detected partial minimum value is located.

In a specific application, step S1421 is specifically described as follows.

The partial minimum value is detected in the first region of the horizontal space distribution histogram, and the detected partial minimum value is the ordinate of the human head $y_{head}$, wherein, the first region is a closed interval of [vertical centerline abscissa $x_{mid}$–a first set value, vertical centerline abscissa $x_{mid}$+a second set value].

In a specific application, the first set value and the second set value may be the same or different and may be set according to the actual needs of the user. For example, if the size of the first region is defined as 31 pixels and the first set value and the second set value are the same, then the first partial region is [$x_{mid}$–15, $x_{mid}$+15].

In S1422, the method may include obtaining the number of pixel points each having a pixel value same to a pre-set pixel threshold, in each row of a second region of the horizontal space distribution histogram, and searching row by row from top to bottom in the second region, to determine the ordinate of the foot of the human body according to the row where the number of pixel points is less than a pre-set threshold.

In a specific application, step S1422 is specifically described as follows.

In the second region of the horizontal space distribution histogram, the number of pixel points each having a pixel value same to the pre-set pixel threshold, in each row of the second region, is obtained, and the coordinate of the row where the number of pixel points is less than the pre-set threshold, is determined as the ordinate of the foot $y_{foot}$ of the human body, wherein the second region is a closed interval of [the bottom of the horizontal space distribution histogram, a position at a distance of a third set value away from the bottom of the horizontal space distribution histogram].

In a specific application, the third set value may be set according to actual needs. For example, if the size of the second region is defined as 60 pixels, the second region is the region between the bottom of the horizontal space distribution histogram and the position 60 pixels away from the bottom. In a specific application, the pre-set pixel threshold may be 255. When the number of pixel points each having a pixel value less than 255 in each row is acquired, it is possible to detect the pixel point with a pixel value of 255 in each row of the image in the second region from top to bottom, and then to count the number of the pixel points each having a pixel value of 255 in each row. The row with the number of the pixel points each having a pixel value of 255 less than the pre-set threshold is the position where the ordinate of the foot $y_{foot}$ is located.

In S143, the method may include obtaining the height of the human body according to the ordinate of the head and the ordinate of the foot.

In one embodiment, the formula for obtaining the human height in step S143 is as follows:

$$\text{height}=|y_{foot}-y_{head}|.$$

In S144, according to the ordinate of the head or the ordinate of the foot and the abscissa of the vertical centerline, the height, the vertical space distribution histogram, the horizontal space distribution histogram, and the pre-set human-body proportion model, a limb contour image corresponding to each limb of the human body may be obtained.

In one embodiment, step S144 includes following steps.

In S1441, according to die ordinate of the head or the ordinate of the foot and the abscissa of the vertical centerline, the height, the horizontal space distribution histogram, and the pre-set human-body proportion model the ordinate of the human shoulder and the width of the human head with respect to the abscissa of the vertical centerline may be acquired.

In S1442, according to the height, the human-body proportion model and the vertical space distribution histogram, an accurate width of the head and a head contour image may be obtained.

In S1443, according to the image information above the shoulder in the human-body contour image, the head contour image is removed to acquire the left and right dual-arm contour images of the human body.

In a specific application, an edge detection operation may be performed on the left and right arm contour images to acquire the edge contours of the left and right arms of the human body. According to the shape characteristics of the human arms and the curvature variation of the contour, coordinate of the left and right elbow can be acquired. By cutting the positions of the inflection points of the left and right elbows, contour images of the upper arms and lower arms of both left and right arms can be acquired respectively.

In a specific application, the coordinates of the human shoulder may be acquired according to the ordinate of the head or the ordinate of the foot and the height, the horizontal space distribution histogram, and the pre-set human-body proportion model.

Step S1441 specifically includes steps as follows.

In S1441-1, according to the ordinate $y_{head}$ of head or the ordinate of foot $y_{foot}$ and the height height, the ratio of the human height and the chest in the pre-set human-body proportion model HEIGHT_CHEST_RATIO, a first ordinate of the human shoulder, $y_{shoulder}$, may be acquired. When calculating with the ordinate of human head $y_{head}$, the expression of the first ordinate of shoulder $y_{shoulder}$ is as follows;

$y_{shoulder}$=height*HEIGHT_SHOULDER_RATIO+$y_{head}$;

Herein, HEIGHT_CHEST_RATIO is an average value attained based on the measurement values of the human height and the horizontal position of the human shoulder in N human-body millimeter-wave grayscale images, and in this embodiment, the HEIGHT_CHEST_RATIO is 0.2, optionally. The first ordinate of shoulder, $y_{shoulder}$, is an approximate value of the requested shoulder ordinate.

In a specific application, the ordinate of the foot, $y_{foot}$, may also be used to determine the first ordinate of shoulder of the human body, which is not limited in this embodiment.

In S1441-2, according to the horizontal space distribution histogram, a peak region near the first ordinate of shoulder is acquired, and the ordinate corresponding to the peak region is determined as a second ordinate of shoulder, wherein the distance between the peak region and the first ordinate of the chest is less than a first pre-set distance threshold.

In S1441-3: according to the imaging characteristics of the human shoulder, one peak region exists in the horizontal space distribution histogram near the position of the shoulder's ordinate, with a corresponding ordinate $y'_{shoulder}$, i.e., the second ordinate of the shoulder of human body.

In S1441-4: an expression to acquire the ordinate of the shoulder $y^*_{shoulder}$ based on the first ordinate of the shoulder and the second of the shoulder is as follows:

$y^*_{shoulder}=(y_{shoulder}+y'_{shoulder})/2.$

Step S1443 includes following steps.

In S1443-1, according to the characteristic that the grayscale image of the human body's left and right arms seems to be discontinuously plaque-like and the imaging region of the human tissue is comparatively large, a plaque region with a large imaging region is obtained as the region where the dual-arm contour image is located.

In S1443-2, calculating a ratio of the first imaging area and the second imaging area, to the area of the plaque region in the plaque region, and if the ratio is within a pre-set interval, the first imaging area and the second imaging area would be regarded as the dual-arm contour image. If the ratio is not within the pre-set interval, it means that the first imaging area includes the dual-arm contour image, and by cutting the first imaging area according to the curvature change of a fitted circumscribed polygon, the upper arm contour image and the lower arm contour image may be acquired.

In a specific application, the pre-set interval is optionally of [1, 10].

In one embodiment, step S144 further includes steps as follows.

In S1444, the method may include obtaining the human chest ordinate.

Step S1444 includes following steps:

In Step S1444-1, according to the ordinate of the head $y_{head}$ or the ordinate of the human foot $y_{foot}$ and the height height, the ratio of height and chest in the pre-set human-body proportion model HEIGHT_CHEST_RATIO, a first ordinate $y_{chest}$ of the human chest is acquired. When calculating with the $y_{head}$ of the head ordinate, the expression of the first ordinate of the chest is as follows:

$y_{chest}$=height*HEIGHT_CHEST_RATIO+$y_{head}$;

Herein, HEIGHT_CHEST_RATIO is an average value attained based on measured values of the human height and the horizontal position of the human chest in N human-body millimeter-wave grayscale images, and is optionally (3.8 in the present embodiment. The first ordinate of the chest $y_{chest}$ is an approximate value of the ordinate of the chest.

In a specific application, the ordinate of the foot $y_{foot}$ may also be used to determine the first ordinate of the chest, which is not limited in this embodiment.

In Step S1444-2, according to the horizontal space distribution histogram, a peak region near the first ordinate of the chest is acquired, and the ordinate corresponding to the peak region is determined as the second ordinate of the chest, wherein the distance between the peak region and the first ordinate of the chest is less than a second pre-set distance threshold.

In S1444-3, according to the imaging characteristics of the human chest contour image, one peak region exists in the horizontal space distribution histogram near the position of the first ordinate of the chest, with a corresponding ordinate is $y'_{chest}$, i.e., the second ordinate of the chest.

In S1444-4: an expression for acquiring the ordinate of the chest $y^*_{chest}$ according to the first ordinate of the chest and the second ordinate of the chest is as follows:

$y^*_{chest}=(y_{chest}+y'_{chest})/2.$

In one embodiment, step S144 further includes following steps.

In S1445, the method may include obtaining the ordinate of the human abdomen.

Step S1445 may specifically include steps as follows:

According to the ordinate of the head $y_{head}$ or the ordinate of the foot $y_{foot}$ and the height height, the ratio of the human height and the abdomen in the pre-set human-body proportion model HEIGHT_ABDOMEN_RATIO, a first ordinate of the human abdomen, $y_{abdomen}$, may be acquired. When calculating with the ordinate of human head $y_{head}$ the expression of the first ordinate of abdomen is as follows:

$$y_{abdomen}=\text{height}*\text{HEIGHT\_ABDOMEN\_RATIO}+y_{head};$$

Herein, HEIGHT_ABDOMEN_RATIO is an average value attained based on measurement values of the human height and the horizontal position of the human abdomen in N human-body millimeter-wave grayscale images, and is optionally 0.44 in this example. The first ordinate of the human abdomen $y_{abdomen}$ is an approximate value of the attained ordinate of the abdomen.

In a specific application, the ordinate of the foot $y_{foot}$ may also be used to determine the first ordinate of the abdomen, which is not limited in this embodiment.

In one embodiment, step S144 further includes steps as follows.

In S1446, the method may include obtaining the ordinate of the crotch of the human body.

Step S1446 specifically includes steps as follows.

In S1446-1, according to the ordinate of the head $y_{head}$ or the ordinate of the human foot $y_{foot}$ and the height height, the ratio of height and crotch HEIGHT_CROTCH_RATIO in the pre-set human-body proportion model, a first ordinate of the human crotch $y_{crotch}$ is acquired. When calculating with the $y_{head}$ of the ordinate of the head, the expression of the first ordinate of the crotch $y_{crotch}$ is as follows:

$$y_{crotch}=\text{height}*\text{HEIGHT\_CROTCH\_RATIO}y_{head}.$$

Herein, HEIGHT_CROTCH_RATIO is an average value attained based on measured values of the human height and the horizontal position of the human crotch in N human-body millimeter-wave grayscale images, and is optionally 0.51 in the present embodiment. The first ordinate of the crotch $y_{crotch}$ is the approximate value of the ordinate of the crotch.

In a specific application, the ordinate of the foot may also be used to determine the first ordinate of the crotch, which is not limited in this embodiment.

In S1446-2: according to the horizontal space distribution histogram, a valley region near the first ordinate of the crotch is acquired, and the ordinate corresponding to the valley region is determined as the second ordinate of the crotch, wherein the distance between the valley region and the first ordinate of the crotch is less than a third pre-set distance threshold.

In S1446-3, according to the imaging characteristics of the human crotch contour image, there is one peak region in the horizontal space distribution histogram near the position of the first ordinate of the crotch, with a corresponding ordinate is i.e., the second ordinate of the crotch.

In S1446-4: an expression for acquiring the ordinate of the crotch $y^*_{crotch}$ according to the first ordinate of the crotch and the second ordinate of the crotch is as follows:

$$y^*_{crotch}=(y_{crotch}+y'_{crotch})/2.$$

In one embodiment, step S144 further includes following steps.

In S1447, the method may include obtaining the ordinate of the human knee.

Step S1447 specifically includes steps as follows:

In S1447-1: according to the ordinate of the head $y_{head}$ or the ordinate of the foot $y_{foot}$ and the height height, the ratio of the height and the knee in the pre-set human-body proportion model HEIGHT_KNEE_RATIO, a first ordinate $y_{knee}$ of the human knee is acquired. When calculating with the ordinate of human head $y_{head}$, the expression of the first ordinate of the knee $y_{knee}$ is as follows:

$$y_{knee}=\text{height}*\text{HEIGHT\_KNEE\_RATIO}+y_{head};$$

Herein, HEIGHT_KNEE_RATIO is an average value attained based on measurement values of the human height and the horizontal position of the knee in N human-body millimeter-wave grayscale images, and is optionally 0.78 in the present embodiment. The first ordinate of the knee is an approximate value of the ordinate of the knee.

In a specific application, the ordinate of the foot $y_{coot}$ may also be used to determine the first ordinate of the knee, which is not limited in this embodiment.

In S1447-2, according to the horizontal space distribution histogram, a peak region near the first ordinate of the knee is acquired, and the ordinate corresponding to the peak region is determined as a second ordinate of the knee, wherein the distance between the peak region and the first ordinate of the knee is less than a fourth pre-set distance threshold.

In S1447-3: according to the imaging characteristics of the human knee contour image, one peak region exists in the horizontal space distribution histogram near the position of the first ordinate of the knee, with a corresponding ordinate $y'_{knee}$, i.e., the second ordinate of the knee.

In S1447-4: an expression for acquiring the ordinate of the knee $y^*_{knee}$ according to the first ordinate of the knee and the second ordinate of the knee is as follows:

$$y^*_{knee}=(y_{knee}+y'_{knee})/2;$$

In S1447-5, according to the ordinate of the knee, the human-body contour image below the crotch is segmented to acquire a dual-leg human-body contour image.

Third Embodiment

This embodiment discloses further details of steps S150 and S160 in the first embodiment, on the basis of the second embodiment, and in this embodiment, step S150 includes steps as follows:

In S151, the method may include performing grayscale gradient feature extraction, edge feature extraction, average grayscale variance calculation, and edge smoothness calculation on the limb contour image.

In S152, the method may include determining whether there is a foreign matter in the limb contour image, according to the grayscale gradient feature, the edge feature, the average grayscale variance, and the edge smoothness.

In one embodiment, step S152 includes following steps.

The method may include determining whether the current LBP feature value of the limb contour image is within a pre-set LBP feature threshold interval, wherein the LBP feature threshold interval is [LBP feature threshold minimum value $T_{min}^i$, LBP feature threshold maximum value $T_{max}^i$].

If so, it may be determined that there is no foreign matter in the limb contour image, otherwise, it may be determined that there is a foreign matter in the limb contour image.

According to the above method, it is determined sequentially whether there is a foreign matter in the limb contour image corresponding to each limb.

In another embodiment, step S152 includes following steps.

The method may include determining whether the current contour curvature feature value of the limb contour image is within a pre-set contour curvature feature threshold interval, wherein the contour curvature feature threshold interval is [contour curvature feature threshold minimum value $K_{min}^i$, contour curvature feature threshold maximum value $K_{max}^i$].

If so, it may be determined that there is no foreign matter in the limb contour image, otherwise, it may be determined that there is a foreign matter in the limb contour image.

In this embodiment, step S160 includes following steps.

In S161, the method may include marking the position of the foreign matter in the limb contour image.

In step S162, the method may include generating the foreign-matter detection result according to the position of the foreign matter in the limb contour image.

Fourth Embodiment

Figure 9:
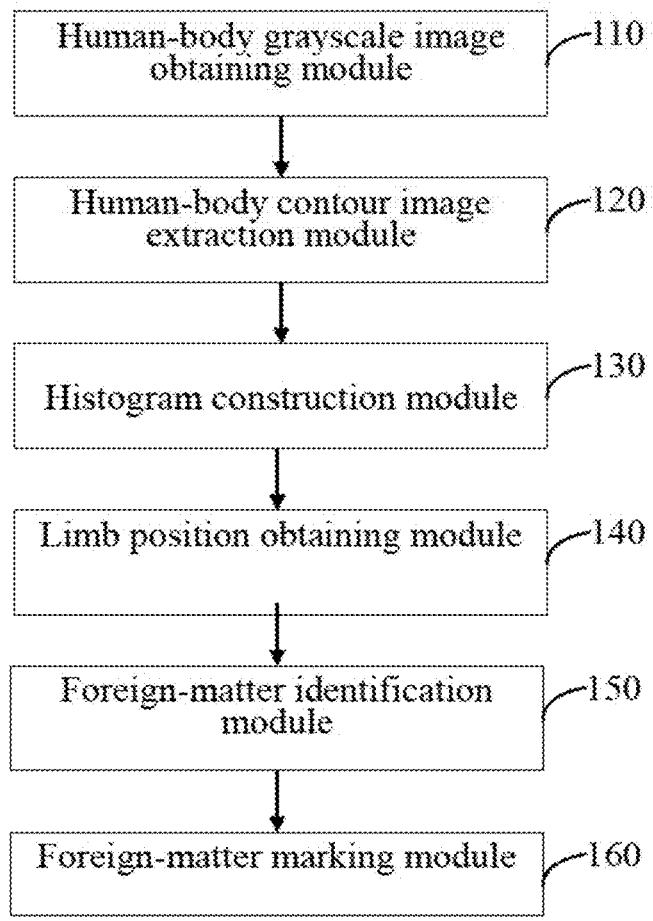
FIG. 9 is a structural diagram of a human-body foreign-matter detection system based on millimeter-wave image provided by a fourth embodiment of the present disclosure.

As shown in FIG. 9, a human-body foreign-matter detection system based on millimeter-wave image provided in this embodiment includes modules as follows.

A human-body grayscale image obtaining module 110 is configured to obtain a human-body millimeter-wave grayscale image.

A human-body contour image extraction module 120 is configured to extract the human-body contour image from the millimeter-wave grayscale image.

A histogram construction module 130, is configured to construct a vertical space distribution histogram in the vertical direction and a horizontal space distribution histogram in the horizontal direction for the human-body contour image.

A limb position obtaining module 140, is configured to obtain positions of limbs of the human body according to the vertical space distribution histogram, the horizontal space distribution histogram and a pre-set human-body proportion model.

A foreign-matter identification module 150, is configured to identify foreign matters in the human-body contour image according to pre-set foreign-matter feature identification models.

A foreign-matter marking module 160 is configured to mark a position of the foreign matter on the human-body contour image according to the positions of limbs and generating a foreign-matter detection result.

In a specific application, the human-body grayscale image obtaining module 110 may specifically include a millimeter-wave data collecting device (for example, a millimeter-wave transceiver) and a millimeter-wave imaging system (for example, a millimeter-wave imager).

In one embodiment, the human-body contour image extraction module 120 is specifically configured to perform following operations.

One of the operation is to perform grayscale segmentation on the millimeter-wave grayscale image I(x,y), to obtain a binarized image B(x,y) of the millimeter-wave grayscale, image I(x,y).

Another operation is to perform morphological operation on fee binarized image B(x,y) both in the horizontal direction and the vertical direction, to generate a human-body contour image $B_2$(x,y).

In a specific application, the human-body contour image extraction module 120 is further specifically configured to perform following operation.

The operation is to perform morphological expansion and erosion operations on the image B(x,y) in the horizontal and vertical directions.

In one embodiment, the foreign-matter identification module 150 includes following units.

A metallic foreign-matter identification unit is configured to determine a position of a metallic foreign matter according to an region where grayscale values of the human-body contour image are greater than a pre-set grayscale threshold with a clear contour.

A non-metallic foreign-matter identification unit, is configured to determine the position of a non-metallic foreign matter according to a geometrical region with a complex texture and a clear contour in the human-body contour image.

An edge foreign-matter identification unit, is configured to determine a position of a foreign matter on the edge of the human-body contour image, according to a region with a clear contour and near the edge of the human-body contour image, in the millimeter-wave grayscale image.

In the embodiment of the present disclosure, by obtaining the human-body millimeter-wave grayscale image, the human-body contour image from the millimeter-wave grayscale image is extracted, and the positions of limbs of the human body is obtained according to a vertical space distribution histogram in the vertical direction and a horizontal space distribution in the horizontal direction for the human-body contour image. Based on the pre-set foreign-matter feature identification models, the foreign matter in the human-body contour image is identified, and by marking the position of the foreign matter on the human-body contour image and generating a foreign-matter detection result, it may greatly improve the accuracy of the foreign-matter detection, and both metallic foreign matters and non-metallic foreign matters may be identified.

Fifth Embodiment

Figure 10:
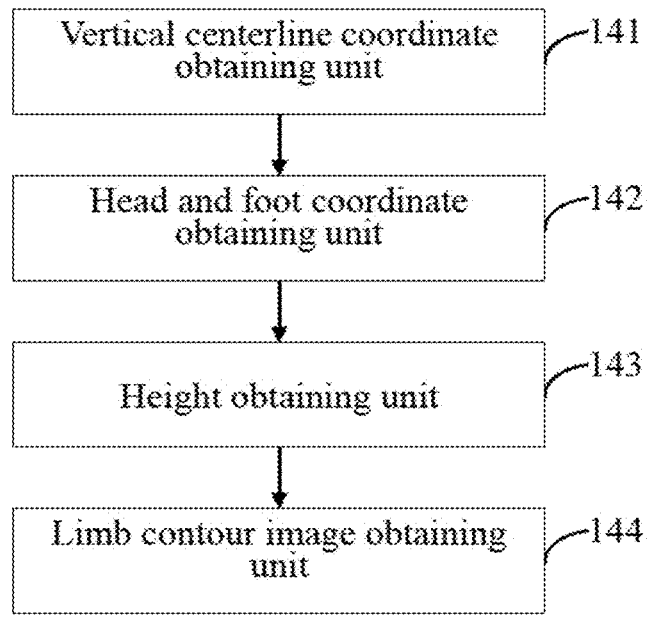
FIG. 10 is a structural diagram of a limb position obtaining module provided by a fifth embodiment of the present disclosure.

As shown in FIG. 10, this embodiment discloses further details of the limb position obtaining module 140 in the fourth embodiment. The limb position obtaining module 140 includes following units.

A vertical centerline coordinate obtaining unit 141 is configured to obtain an abscissa of a vertical centerline of the human body according to the vertical space distribution histogram.

A head and foot coordinate obtaining unit 142 is configured to detect a partial minimum value of the horizontal space distribution histogram to obtain the ordinate of the human head and the ordinate of the human foot.

A height obtaining unit 143 is configured to obtain the human height according to the ordinate of the head and the ordinate of the foot.

A limb contour image obtaining unit 144 is configured to obtain a limb contour image corresponding to each limb of the human body, according to the ordinate of the head or the ordinate of the foot, the abscissa of the vertical centerline, the height, the vertical space distribution histogram, the horizontal space distribution histogram, and the pre-set human-body proportion model.

In one embodiment, the vertical centerline coordinate obtaining unit 141 is specifically configured to perform following operations.

One operation is to extract an upper half of the vertical distribution histogram as a sub-vertical distribution histogram.

Another operation is to obtain the maximum value of the sub-vertical distribution histogram.

In one embodiment, the head and foot coordinate obtaining unit 142 specifically includes following subunits.

A head coordinate obtaining subunit is configured to detect a partial minimum value of a first region of the horizontal space distribution histogram, and to determine fee ordinate of the human head according to the row where the detected partial minimum value is located.

A foot coordinate obtaining subunit, is configured to obtain the number of the pixel points each having a pixel value same to a pre-set pixel threshold, in each row of a second region of the horizontal space distribution histogram, and to search row by row from top to bottom in the second region, to determine the ordinate of the foot of the human body according to the row where the number of pixel points is less than a pre-set threshold.

In a specific application, the head coordinate obtaining subunit is specifically configured to perform following operation.

The operation is to detect a partial minimum value in the first region of the horizontal space distribution histogram, and the partial minimum value detected is the ordinate of the human head wherein the first region is a closed interval of [vertical centerline abscissa $x_{mid}$–a first set value, vertical centerline abscissa $x_{mid}$+a second set value].

In a specific application, the foot coordinate obtaining subunit is specifically configured to perform following operation.

In the second region of the horizontal space distribution histogram, the operation is to obtain the number of the pixel points each having a pixel value same to the pre-set pixel threshold, in each row of the second region, and to determine the coordinate of fee row where fee number of pixel points is less than the pre-set threshold, as the ordinate of the foot $y_{foot}$ of the human body, wherein the second region is a closed interval of [the bottom of fee horizontal space distribution histogram, a position at a distance of a third set value away from the bottom of the horizontal space distribution histogram].

In one embodiment, fee limb contour image obtaining unit 144 includes following subunits.

A shoulder coordinates and head width obtaining subunit is configured to acquire the ordinate of the human shoulder and the width of the human head with respect to the abscissa of the vertical centerline, according to the ordinate of the head or the ordinate of the foot, the abscissa of the vertical centerline, the height, the horizontal space distribution histogram, and the pre-set human-body proportion model.

A head contour image obtaining subunit is configured to obtain an accurate width of the head and a head contour image, according to the height, the human-body proportion model and the vertical space distribution histogram.

A left and right dual-arm contour image obtaining subunit is configured to remove the head contour image according to the image information above the shoulder in the human-body contour image to acquire the left and right dual-arm contour image of the human body.

A chest coordinates obtaining subunit is configured to acquire a first ordinate of the human chest as an approximate value of the ordinate of the human chest, according to the ordinate of the head or the ordinate of human foot the height, and the ratio of the height and the chest in the pre-set human-body proportion model.

An abdomen coordinates obtaining subunit, is configured to acquire a first ordinate of the human abdomen as an approximate value of the ordinate of the human abdomen, according to the ordinate of the head or the ordinate of the foot, the height, and the ratio of the height and the abdomen in the pre-set human-body proportion model.

A crotch coordinate obtaining subunit is configured to acquire the first ordinate of the human crotch as an approximate value of the ordinate of the human crotch, according to the ordinate of the head or the ordinate of the human foot, the height, and the ratio of the height and crotch in the pre-set human-body proportion model.

A knee coordinates obtaining subunit, is configured to acquire a first ordinate of the human knee as an approximate value of the ordinate of the human knee, according to the ordinate of the head or the ordinate of the human foot, the height, and the ratio of the height and the knee in the pre-set human-body proportion model.

Sixth Embodiment

This embodiment discloses further details of the foreign-matter marking module 160 and the foreign-matter identification module 150 in the fifth embodiment.

In this embodiment, the foreign-matter marking module 160 includes following units.

A foreign-matter position marking unit is configured to mark the position of the foreign matter in the limb contour image.

A foreign-matter detection result generation unit is configured to generate a foreign-matter detection result according to the position of the foreign matter in the limb contour image.

In one embodiment, the foreign-matter identification module 150 is specifically configured to perform following operation.

The operation is to determine whether the current LBP feature value of the limb contour image is within a pre-set LBP feature threshold interval, and the LBP feature threshold interval is [LBP feature threshold minimum value, LBP feature threshold maximum value].

If so, it may be determined that there is no foreign matter in the limb contour image, otherwise, it may be determined that there is a foreign matter in the limb contour image.

According to the above method, it is determined sequentially whether there is a foreign matter in the limb contour image corresponding to each limb.

In another embodiment, the foreign-matter identification module 150 is specifically configured to perform following operation.

One operation is to determine whether the current contour curvature feature value of the limb contour image is within a pre-set contour curvature feature threshold interval, wherein the contour curvature feature threshold interval is [contour curvature feature threshold minimum value, contour curvature feature threshold maximum value];

If so, it may be determined that there is no foreign matter in the limb contour image; otherwise, it may be determined that there is a foreign matter in the limb contour image.

In this embodiment, the foreign-matter marking module 160 is specifically configured to perform following operations.

One operation is to mark a position of the foreign matter in the limb contour image.

Another operation is to generate a foreign-matter detection result according to the position of the foreign matter in the limb contour image.

Seventh Embodiment

Figure 11:
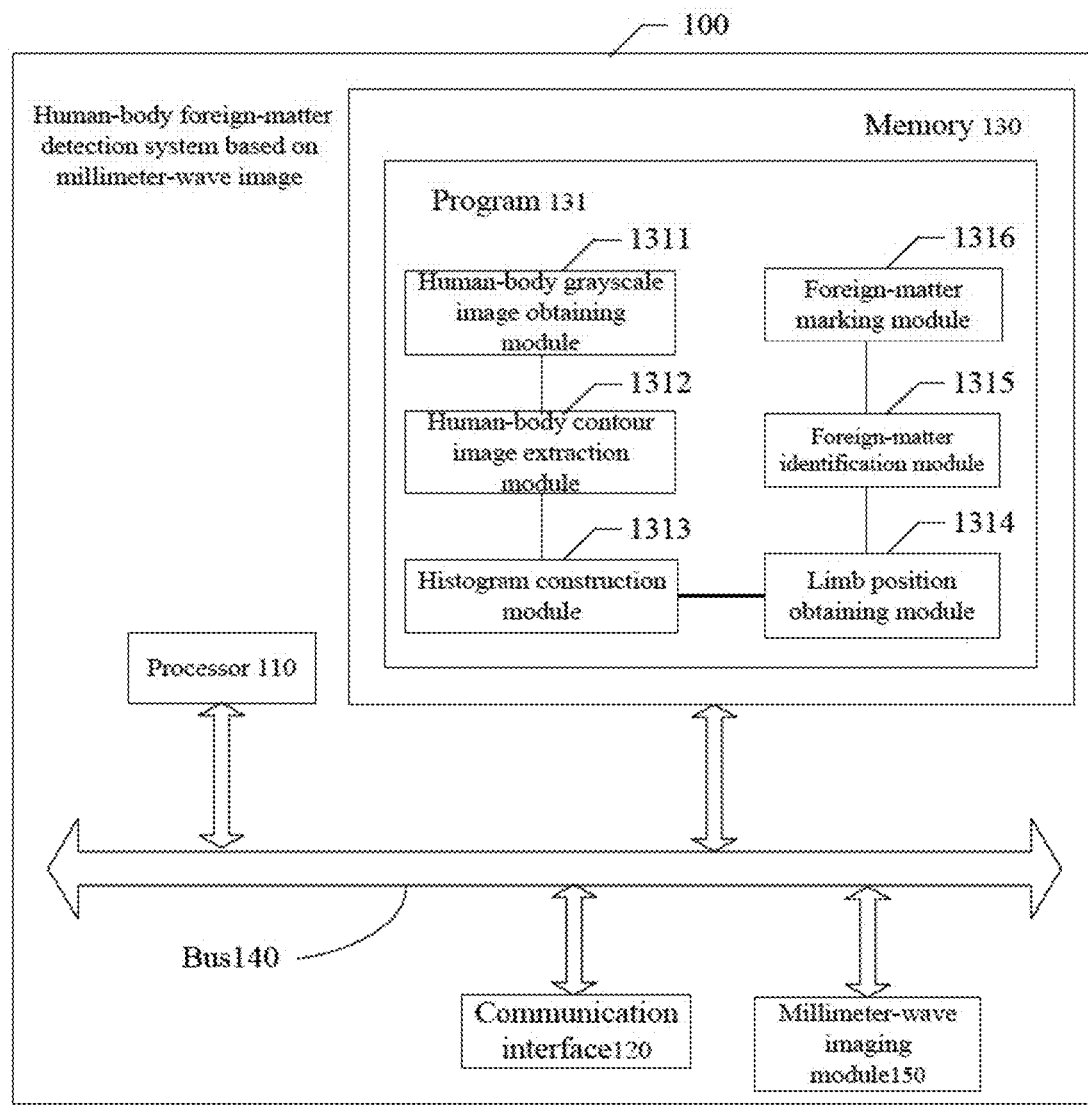
FIG. 11 is a structural diagram of a human-body foreign-matter detection system based on millimeter-wave image provided by a seventh embodiment of the present disclosure.

As shown in FIG. 11, the present embodiment provides a human-body foreign-matter detection system 100 based on millimeter-wave image, including a processor 110, a communications interlace 120, a memory 130, a bus 140, and a millimeter-wave imaging module 150.

The processor 110, the communication interface 120, the memory 130, and the millimeter-wave imaging module 150 complete communication with each other through the bus 140.

The communication interface 120 is configured to communicate with external devices such as personal computers, servers, and the like.

The millimeter-wave imaging module 150 is configured to obtain millimeter-wave data of a human body and process the millimeter-wave data into a millimeter-wave grayscale image of the human body, which may specifically include a millimeter-wave data collecting device (e.g., millimeter-wave transceiver) and a millimeter-wave imaging systems (for example, millimeter-wave imagers).

The processor 110 is configured to execute programs 131.

Specifically the program 131 may include a program code including computer operation instructions.

The processor 110 may be a central processing unit (CPU), an application specific integrated circuit (ASIC), or one or more integrated circuits configured to implement the embodiments of the present disclosure.

The memory 130 is configured to store the program 131. The memory 130 may include a high speed RAM memory, and may also include a non-volatile memory such as at least one disk memory. The program 131 may specifically include following modules.

A human-body grayscale image obtaining module 1311 is configured to obtain a human-body millimeter-wave grayscale image.

A human-body contour image extraction module 1312 is configured to extract the human-body contour image from the millimeter-wave grey-scale image.

A histogram construction module 1313 is configured to construct a vertical space distribution histogram in a vertical direction and a horizontal space distribution histogram in a horizontal direction for the human-body contour image.

A limb position obtaining module 1314, is configured to obtain positions of limbs of the human body according to the vertical space distribution histogram, the horizontal space distribution histogram and a pre-set human-body proportion model.

A foreign-matter identification module 1315 is configured to identify foreign matters in the human-body contour image according to pre-set foreign-matter feature identification models.

A foreign-matter marking module configured to mark a position of the foreign matter on the human-body contour image according to the positions of limbs and generating a foreign-matter detection result.

In one embodiment, program 131 also includes following units.

A vertical centerline coordinate obtaining unit is configured to obtain an abscissa of a vertical centerline of the human body according to the vertical space distribution histogram.

A head and foot coordinate obtaining unit is configured to detect a partial minimum value of the horizontal space distribution histogram to obtain the ordinate of the human head and the ordinate of the human foot.

A height obtaining unit is configured to obtain the human height according to the ordinate of the head and the ordinate of the foot.

A limb contour image obtaining unit is configured to obtain a limb contour image corresponding to each limb of the human body, according to the ordinate of the head or the ordinate of the foot, the abscissa of the vertical centerline, the height, the vertical space distribution histogram, the horizontal space distribution histogram, and the pre-set human-body proportion model.

In one embodiment, program 131 also includes following subunits.

A head coordinate obtaining subunit is configured to detect a partial minimum value of a first region of the horizontal space distribution histogram, and determining the ordinate of the human head according to the row where the detected partial minimum value is located.

A foot coordinate obtaining subunit, is configured to obtain the number of pixel points each having a pixel value same to a pre-set pixel threshold, in each row of a second region of the horizontal space distribution histogram, and to determine the ordinate of the foot of the human body according to the row where the number of pixel points is less than a pre-set threshold.

In one embodiment, program 131 also includes following units.

A foreign-matter position marking unit is configured to mark the position of the foreign matter in the limb contour image.

A foreign-matter detection result generation unit, is configured to generate a foreign-matter detection result according to the position of the foreign matter in the limb contour image.

In one embodiment, program 131 also includes following units.

A metallic foreign-matter identification unit is configured to determine a position of a metallic foreign matter according to a region where grayscale values of the human-body contour image are greater than a pre-set grey-scale threshold with a clear contour.

A non-metallic foreign-matter identification unit is configured to determine the position of a non-metallic foreign matter according to a geometrical region with a complex texture and a clear contour in the human-body contour image.

An edge foreign-matter identification unit is configured to determine a position of a foreign matter on the edge of the human-body contour image, according to a region with a clear contour and near the edge of the human-body contour image, in the millimeter-wave grayscale image.

A general integrated circuit such as a central processing unit (CPU) or an application specific integrated circuit (ASIC) may implement the modules, units or subunits in all embodiments of the present disclosure.

The steps in the method of the embodiments of the present disclosure may be adjusted in sequence, combined and deleted according to actual needs.

The units in the system of the embodiments in the present disclosure can be combined, divided, and deleted according to actual needs, and there is a one-to-one correspondence between the functions of each module, unit, or subunit in the system and the method steps. The technical features in the system may be added based on technical features recorded in steps of the method.

The one of ordinary skill in the art may understand that all or part of the processes for implementing the above embodiments, may be accomplished by a computer program instructing related hardware, and the program may be stored in a computer-readable storage medium. When the program is executed, the flow of the embodiment of each method may be included. The storage medium may be a magnetic disk, an optical disk, a read-only memory (ROM) or random access memory (RAM) etc.

The above descriptions are merely advantageous embodiments of the present disclosure and are not intended to limit the present disclosure. Any modification, equivalent replacement and improvement made within the spirit and principle of the present disclosure shall be included in the protection scope of the present disclosure.

What is claimed is:

1. A human-body foreign-matter detecting method based on millimeter-wave image, comprising:
   obtaining a millimeter-wave grayscale image of a human body;
   extracting a human-body contour image from the millimeter-wave grayscale image;
   constructing a vertical space distribution histogram in a vertical direction and a horizontal space distribution histogram in a horizontal direction for the human-body contour image;
   obtaining positions of limbs of the human body according to the vertical space distribution histogram, the horizontal space distribution histogram and a pre-set human-body proportion model;
   identifying a foreign matter in the human-body contour image according to pre-set foreign-matter feature identification models,
      wherein the identifying a foreign matter in the human-body contour image comprises: extracting a grayscale gradient feature from the human-body contour image, extracting an edge feature from the human-body contour image, calculating an average grayscale variance of the human-body contour image, and calculating edge smoothness of the human-body contour image; and
      determining presence or absence of the foreign matter in the human-body contour image based on the grayscale gradient feature, the edge feature, the average grayscale variance, and the edge smoothness; and
   marking a position of the foreign matter on the human-body contour image according to the positions of limbs, and generating a foreign-matter detection result.

2. The human-body foreign-matter detection method based on millimeter-wave image of claim 1, wherein the step of obtaining positions of limbs of the human body according to the vertical space distribution histogram, the horizontal space distribution histogram and the pre-set human-body proportion model, further comprises:
   obtaining an abscissa of a vertical centerline of the human body according to the vertical space distribution histogram;
   detecting a partial minimum value of the horizontal space distribution histogram to obtain an ordinate of a head of the human body and an ordinate of a foot of the human body;
   obtaining a human height according to the ordinate of the head and the ordinate of the foot; and
   obtaining a limb contour image corresponding to each limb of the human body, according to the ordinate of the head or the ordinate of the foot, the abscissa of the vertical centerline, the height, the vertical space distribution histogram, the horizontal space distribution histogram, and the pre-set human body proportion model.

3. The human-body foreign-matter detection method based on millimeter-wave image of claim 2, wherein the step of detecting the partial minimum value of the horizontal space distribution histogram to obtain die ordinate of the head of the human body and the ordinate of the foot of the human body, further comprises:
   detecting a partial minimum value of a first region of the horizontal space distribution histogram, and determining the ordinate of the head of the human body according to a row where the detected partial minimum value is located: and
   obtaining the number of pixel points each having a pixel value same to a pre-set pixel threshold, in each row of a second region of the horizontal space distribution histogram, and determining the ordinate of the foot of the human body according to a row where the number of pixel points is less than a pre-set threshold.

4. The human-body foreign-matter detection method based on millimeter-wave image of claim 2, wherein the step of marking the position of the foreign matter on the human-body contour image according to the positions of limbs, and generating the foreign-matter detection result, comprises:
   marking the position of the foreign matter in the limb contour image;
   generating the foreign-matter detection result according to the position of the foreign matter in the limb contour image.

5. The human-body foreign-matter detection method based on millimeter-wave image of claim 1, wherein the step of identifying the foreign matter in the human-body contour image according to the pre-set foreign-matter feature identification models, comprises:
   determining a position of a metallic foreign matter according to an region where grayscale values of the human-body contour image are greater than a pre-set grayscale threshold and being a clear contour;
   determining a position of a non-metallic foreign matter according to a geometrical region with a complex texture and a clear contour in the human-body contour image; and
   determining a position of the foreign matter on the edge of the human-body contour image, according to a region with a clear contour and located near the edge of the human-body contour image, in the millimeter-wave grayscale image.

6. A human-body foreign-matter detection system based on millimeter-wave image, comprising:
   a human-body grayscale image obtaining module, configured to obtain a human body millimeter-wave grayscale image;
   a human-body contour image extraction module, configured to extract a human-body contour image from the millimeter-wave grayscale image;
   a histogram construction module, configured to construct a vertical space distribution histogram in a vertical direction and a horizontal space distribution histogram in a horizontal direction for the human-body contour image;
   a limb position obtaining module, configured to obtain positions of limbs of the human body according to the vertical space distribution histogram, the horizontal space distribution histogram and a pre-set human-body proportion model;
   a foreign-matter identification module, configured to identify foreign matters in the human-body contour image according to pre-set foreign-matter feature identification models,
      wherein when identifying foreign matters in the human-body contour image according to pre-set foreign-matter feature identification models, the foreign-matter identification module is further configured to: extract a grayscale gradient feature from the human-body contour image, extract an edge feature from the human-body contour image, calculate an average grayscale variance of the human-body contour image, and calculate edge smoothness of the human-body contour image; and determine presence or absence of the foreign matter in the human-body contour image based on the grayscale gradient feature, the edge feature, the average grayscale variance, and the edge smoothness; and a foreign-matter marking module, configured to mark a position of the foreign matter on the human-body contour image according to the positions of limbs, and to generate a foreign-matter detection result.

7. The human-body foreign-matter detection system based on millimeter-wave image of claim 6, wherein the limb position obtaining module comprises:

a vertical centerline coordinate obtaining unit, configured to obtain an abscissa of a vertical centerline of the human body according to the vertical space distribution histogram;

a head and foot coordinate obtaining unit, configured to detect a partial minimum value of the horizontal space distribution histogram to obtain an ordinate of a head of the human body and an ordinate of a foot of the human body;

a height obtaining unit, configured to obtain a human height according to the ordinate of the head and the ordinate of the foot; and a limb contour image obtaining unit, configured to obtain a limb contour image corresponding to each limb of the human body, according to the ordinate of the head or the ordinate of the foot, the abscissa of the vertical centerline, the height, the vertical space distribution histogram, the horizontal space distribution histogram, and the pre-set human body proportion model.

8. The human-body foreign-matter detection system based on millimeter-wave image of claim 7, wherein the head and foot coordinate obtaining unit comprises:

a head coordinate obtaining subunit, configured to detect a partial minimum value of a first region of the horizontal space distribution histogram, and to determine the ordinate of the head of the human body according to a row where the detected partial minimum value is located; and a foot coordinate obtaining subunit, configured to obtain the number of pixel points each having a pixel value same to a pre-set pixel threshold, in each row of a second region of the horizontal space distribution histogram, and determining the ordinate of the foot of the human body according to a row where the number of pixel points is less than a pre-set threshold.

9. The human-body foreign-matter detection system based on millimeter-wave image of claim 7, wherein the foreign-matter marking module comprises:

a foreign-matter position marking unit, configured to mark the position of the foreign matter in the limb contour image; and a foreign-matter detection result generation unit, configured to generate the foreign-matter detection result according to the position of the foreign matter in the limb contour image.

10. The human-body foreign-matter detection system based on millimeter-wave image of claim 6, wherein the foreign-matter identification module comprises:

a metallic foreign-matter identification unit, configured to determine a position of a metallic foreign matter according to an region where grayscale values of the human-body contour image are greater than a pre-set grayscale threshold and being a clear contour;

a non-metallic foreign-matter identification unit, configured to determine a position of a non-metallic foreign matter according to a geometrical region with a complex texture and a clear contour in the human-body contour image; and an edge foreign-matter identification unit, configured to determine a position of a foreign matter on the edge of the human-body contour image, according to a region with a clear contour and located near the edge of the human-body contour image, in the millimeter-wave grayscale image.

* * * * *